United States Patent
Miyake

(10) Patent No.: US 9,132,790 B2
(45) Date of Patent: Sep. 15, 2015

(54) IN-VEHICLE NETWORK SYSTEM

(75) Inventor: Junji Miyake, Hitachinaka (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 0 days.

(21) Appl. No.: 14/127,062

(22) PCT Filed: Jul. 3, 2012

(86) PCT No.: PCT/JP2012/066945
§ 371 (c)(1),
(2), (4) Date: Dec. 17, 2013

(87) PCT Pub. No.: WO2013/005730
PCT Pub. Date: Jan. 10, 2013

(65) Prior Publication Data
US 2014/0114497 A1    Apr. 24, 2014

(30) Foreign Application Priority Data
Jul. 6, 2011  (JP) .................................. 2011-150357

(51) Int. Cl.
*B60R 16/023* (2006.01)
*H04L 9/32* (2006.01)
*G06F 21/44* (2013.01)

(52) U.S. Cl.
CPC ............ *B60R 16/0231* (2013.01); *G06F 21/44* (2013.01); *H04L 9/32* (2013.01); *G06F 2221/2129* (2013.01); *H04L 2209/84* (2013.01)

(58) Field of Classification Search
CPC ... H04L 9/32; H04L 2209/84; B60R 16/0231; G06F 2221/2129; G06F 21/44

USPC ............................................................. 701/1
See application file for complete search history.

(56) References Cited

U.S. PATENT DOCUMENTS

| 5,016,276 | A | 5/1991 | Matumoto et al. |
| 5,153,919 | A | 10/1992 | Reeds, III et al. |
| 2006/0115085 | A1 | 6/2006 | Iwamura |
| 2011/0083161 | A1* | 4/2011 | Ishida et al. ...................... 726/2 |
| 2013/0227650 | A1 | 8/2013 | Miyake |

FOREIGN PATENT DOCUMENTS

| JP | 5-48980 | B2 | 7/1993 |
| JP | 6-195024 | A | 7/1994 |
| JP | 2005-341528 | A | 12/2005 |

(Continued)

OTHER PUBLICATIONS

Corresponding International Search Report with English Translation dated Jul. 31, 2012 (five (5) pages).

*Primary Examiner* — Mary Cheung
*Assistant Examiner* — Yuen Wong
(74) *Attorney, Agent, or Firm* — Crowell & Moring LLP

(57) ABSTRACT

Provided is an in-vehicle network equipped with a function whereby configuration verification is performed while preventing an increase in the processing load (and cost) for each in-vehicle control device, thus improving vehicle security. This in-vehicle network system is equipped with a configuration management device that authenticates an in-vehicle control device. The configuration management device delivers to the in-vehicle control device, via a registration device connected to the in-vehicle network, configuration verification data that is used to perform configuration verification (see FIG. 1).

14 Claims, 12 Drawing Sheets

(56) References Cited

FOREIGN PATENT DOCUMENTS

| JP | 2006-25298 A | 1/2006 |
| JP | 2007-153021 A | 6/2007 |
| JP | 2007-214696 A | 8/2007 |
| JP | 2010-11400 A | 1/2010 |
| JP | 2010-103693 A | 5/2010 |
| JP | 2012-104049 A | 5/2012 |
| JP | 2013-17140 A | 1/2013 |
| JP | 2013-168865 A | 8/2013 |
| WO | WO 2010/047084 A1 | 4/2010 |

* cited by examiner

IN-VEHICLE NETWORK SYSTEM

TECHNICAL FIELD

The present invention relates to an in-vehicle network system.

BACKGROUND ART

In recent years, cars, trucks, or buses are equipped with a lot of in-vehicle ECUs (Electronic Control Unit) controlling each of function units. Each ECU connects with each other through in-vehicle networks to collaborate.

Typically, control programs in an in-vehicle ECU are stored in storage units such as Flash ROMs (Read Only Memory) of microcomputers embedded in the in-vehicle ECU. The versions of the control programs are managed by manufacturers and are intended that the isolated function of the ECU and the collaboration through the in-vehicle network properly work by combining formal software versions.

Therefore, it cannot be ignore in terms of security if in-vehicle ECUs with unintended software or intentionally falsified in-vehicle ECUs are connected to the in-vehicle network.

Attestation is to certify authenticity of each of in-vehicle ECUs themselves or to certify authenticity of all related in-vehicle ECUs. When attestation is acquired, it is proved that appropriate programs intended by the manufacturer are combined and that intended controls are performed.

Patent Literature 1 listed below describes a method wherein: a common key or a common key generation source is shared among multiple in-vehicle ECUs; and the attestation mentioned above is performed based on whether ECUs that are assumed to share the common key information can establish an encrypted communication with each other.

Patent Literature 2 listed below describes a common key distribution method using KPS (Key Predistribution System) scheme. This scheme may be utilized in Patent Literature 1 as the common key generation source.

CITATION LIST

Patent Literature

Patent Literature 1: JP Patent Publication (Kokai) No. 2010-011400 A
Patent Literature 2: JP Patent Publication (Kokoku) No. 1105-048980 B (1993)

SUMMARY OF INVENTION

Technical Problem

In Patent Literature 1 listed above, in order to share the common key or the common key generation source among multiple ECUs, an external infrastructure such as a center server is necessary. In addition, since the attestation is achieved by establishing encrypted communications between in-vehicle ECUs, a lot of computational power is required when performing the encrypted communication. Hereinafter, these two technical problems will be described in detail.

(1) Regarding Center Server
(1.1) Aggregating Information

A center server is an external server in which all of key information is aggregated. Each of in-vehicle ECUs constructing an in-vehicle network has to connect to the center server to receive the key information. Since all of the key information is aggregated in the center server, whole of the system may be corrupted if the communication between the in-vehicle ECUs and the center server is interrupted, if the center server is attacked, or if a malignant third party spoofs as the center server.

(1.2) Communication With the Center Server

The common key generation source distributed by the KPS scheme is used for the communication between ECUs joining the in-vehicle network. Therefore, in order for the ECUs to communicate with each other securely, it is necessary to acquire the common key generation source from the center server in the initialization process. In such a process, instead of encryption keys unique to each of the ECUs, the ECUs must use a mandatory encryption key to communicate with the center server. This is because in-vehicle ECUs are mass-produced by component manufacturers and are delivered to assemble manufacturers, thus it is inevitable that varieties of the encryption key for the initialization process are mandatory for each of car types, unique component numbers, or lots with same IDs. If the encryption key is mandatory, it is easy for malignant third parties to eavesdrop communications between ECUs and the center server, which may be utilized to illegally acquire the initialization key. If the initialization key is illegally acquired, information in the center server may be illegally acquired. In addition, a deceptive common key may be distributed to ECUs to interrupt communications with other in-vehicle ECUs.

(2) Regarding Encrypted Communication

The technique described in Patent Literature 1 requires: a computational resource recovering the key of the communication destination based on the KSP scheme; and a computational resource executing a common key encryption (e.g. an encryption using DES: Data Encryption Standard scheme) for performing encrypted communication using the recovered key. These processes require significantly large computational resources for the performances of existing in-vehicle ECUs (such as computational capability of CPU, capacity of ROM/RAM). Therefore, in order to achieve the encrypted communication described in Patent Literature 1, increase in costs of in-vehicle ECUs is inevitable.

When designing existing in-vehicle ECUs, cost reduction for each ECU and its components is accumulated to reconcile the price strategy for whole of the car system. The increase in costs of these components cannot be accepted only for the objective of attestation of in-vehicle ECUs.

The present invention is made to solve the technical problem described above, and an objective of the present invention is to provide an in-vehicle network having a function to perform attestation while suppressing increase in process loads (and costs) of each in-vehicle control unit, thereby improving car securities.

Solution to Problem

The in-vehicle network system according to the present invention comprises a configuration management device authenticating in-vehicle control units, wherein the configuration management device distributes, to the in-vehicle control units through a registration device connecting to an in-vehicle network, attestation data used for performing attestation.

Advantageous Effects of Invention

In the in-vehicle network system according to the present invention, the configuration management device authenticating in-vehicle control units is placed in the in-vehicle network, thus it is not necessary to keep the in-vehicle key information at outside of the car. Therefore, it is not necessary to communicate with external devices using unsecure communication schemes, which improves the security. In addition, the registration device is not required to constantly connect to the in-vehicle network. Thus, when registering new in-vehicle control units, an operator may connect the registration device to the in-vehicle network manually. Therefore, the cost of the in-vehicle network itself does not increase even if the processing capability of the registration device is improved. Thus a robust authentication scheme may be used between the registration device and the configuration management device. This suppresses the cost of whole of the in-vehicle network while improving the security.

DESCRIPTION OF EMBODIMENTS

<Embodiment 1>

Figure 1:
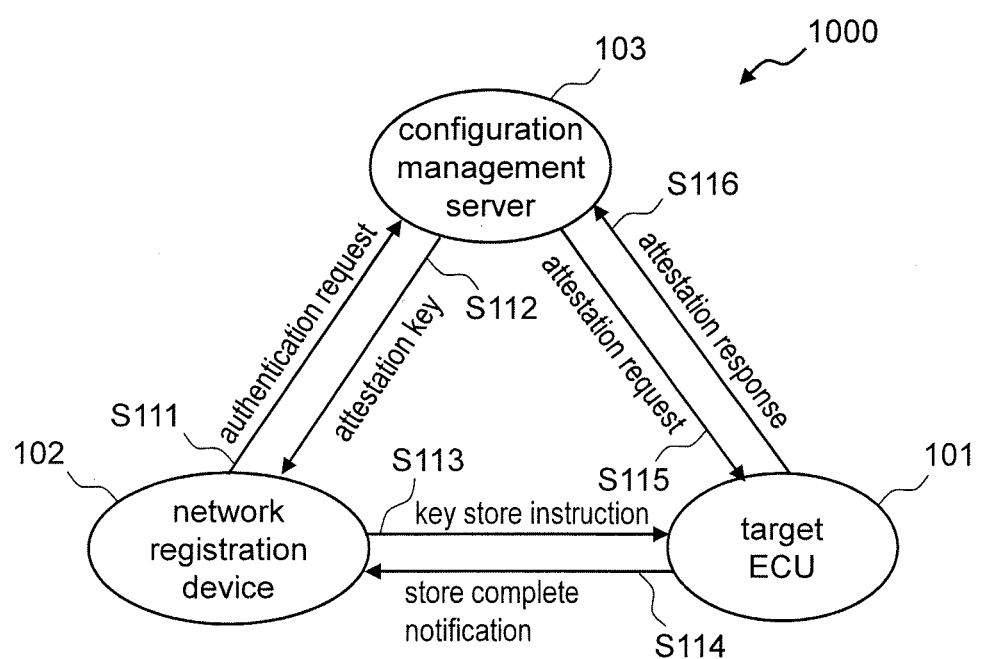
FIG. 1 is a configuration diagram of an in-vehicle network system 1000 according to an embodiment 1.

FIG. 1 is a configuration diagram of an in-vehicle network system 1000 according to an embodiment 1 of the present invention. The in-vehicle network system 1000 is an in-vehicle network connecting ECUs that control car operations. Only one target ECU 101 is shown as a target of attestation in the figure. However, other ECUs may connect to the in-vehicle network system 1000.

The target ECU 101 and a configuration management server 103 are connected to the in-vehicle network system 1000 through an in-vehicle network. In addition, in order to let the target ECU 101 join the in-vehicle network, a network registration device 102 is connected to the in-vehicle network system 1000 as long as necessary.

The configuration management server 103 is a device that can communicate with the target ECU 101 and the network registration device 102 through the in-vehicle network. The configuration management server 103 may be configured as an ECU or as any type of other communication device. The configuration management server 103 authenticates the target ECU 101 and the network registration device 102. The objective of authenticating the target ECU 101 is to check whether the target ECU 101 has a valid authorization to join the in-vehicle network. The objective of authenticating the network registration device 102 is to check whether the network registration device 102 has a valid authorization to let the target ECU 101 join the in-vehicle network.

The network registration device 102 is a device that lets the target ECU 101 join the in-vehicle network. To let the target ECU 101 join the in-vehicle network is to distribute, to the target ECU 101, attestation data required for the target ECU 101 to communicate with other ECUs through the in-vehicle network. In order for the network registration device 102 to let the target ECU 101 join the in-vehicle network, it is necessary for the network registration device 102 to be authenticated by the configuration management server 103 in advance.

The network registration device 102 is not necessarily connected to the in-vehicle network constantly. For example, during construction of the in-vehicle network system 1000 in the car manufacturing process, the network registration device 102 can be manually connected to the in-vehicle network only when doing tasks to let the target ECU 101 join the in-vehicle network.

Hereinafter, according to FIG. 1, the process for the network registration device 102 to let the target ECU 101 join the in-vehicle network will be described.

(FIG. 1: Step S111: Authentication Request)

An operator operates the network registration device 102 to start the task (registration process) to let the target ECU 101 join the in-vehicle network. The network registration device 102, after starting the registration process, requests the configuration management server 103 through the in-vehicle network to authenticate the network registration device 102.

(FIG. 1: Step S111: Authentication Request: Additional Note)

The network registration device 102, along with issuing the authentication request to the configuration management server 103, notifies identification information (details will be described with FIG. 5 later) of the target ECU 101 joining the in-vehicle network to the configuration management server 103. Examples of the identification information may be such as ECU-ID (component number) or software version. The identification information can be manually given by the operator using the network registration device 102, for example.

(FIG. 1: Step S112: Distributing Attestation Key)

The configuration management server 103, upon receiving the authentication request from the network registration device 102, authenticates the network registration device 102 according to a predetermined authentication algorithm (details will be described with FIG. 2 later). If the authenticity of the network registration device 102 is confirmed, the configuration management server 103 updates an internal database (details will be described with FIG. 5 later) using the information received from the network registration device 102 in the authentication request, generates an attestation key (common key) (details will be described with FIG. 6 later) unique to the target ECU 101, and distributes it to the network registration device 102.

(FIG. 1: Step S113: Key Store Instruction)

The network registration device 102 relays, to the target ECU 101, the attestation key (common key) unique to the target ECU 101 distributed from the configuration management server 103, and instructs the target ECU 101 to store it.
(FIG. 1: Step S114: Store Complete Notification)

The target ECU 101 stores, into own memory, the attestation key (common key) unique to the target ECU 101 received in step S113. The target ECU 101 notifies the network registration device 102 that the target ECU 101 properly has joined the in-vehicle network.
(FIG. 1: Step S115: Attestation Request)

The configuration management server 103 assumes that the attestation key (common key) distributed through the network registration device 102 in step S112 is stored in the target ECU 101. On the basis of such assumption, the configuration management server 103 requests the target ECU 101 to prove the target ECU 101's authenticity.
(FIG. 1: Step S115: Attestation Response)

The target ECU 101 responds to the configuration management server 103 based on the shared knowledge of the attestation key (common key) to prove the target ECU 101's authenticity.
(FIG. 1: Step S115: Attestation Response: Additional Note)

The attestation request and the response in steps S115-S116 should be transmitted between the configuration management server 103 and the target ECU 101 mutually. Therefore, in contrast to the arrow directions of steps S115 and S116 shown in FIG. 1, the target ECU 101 may request the attestation to the configuration management server 103 and the configuration management server 103 may respond to the request. In addition, the bidirectional communication may be combined. Namely, the target ECU 101 may request the attestation to the configuration management server 103 before the target ECU 101 proves its attestation to the configuration management server 103, so that the authenticity of the configuration management server 103 is checked before responding the target ECU 101's authenticity to the configuration management server 103, thereby performing mutual handshake.

<Embodiment 1: Authenticating Network Registration Device>

Figure 2:
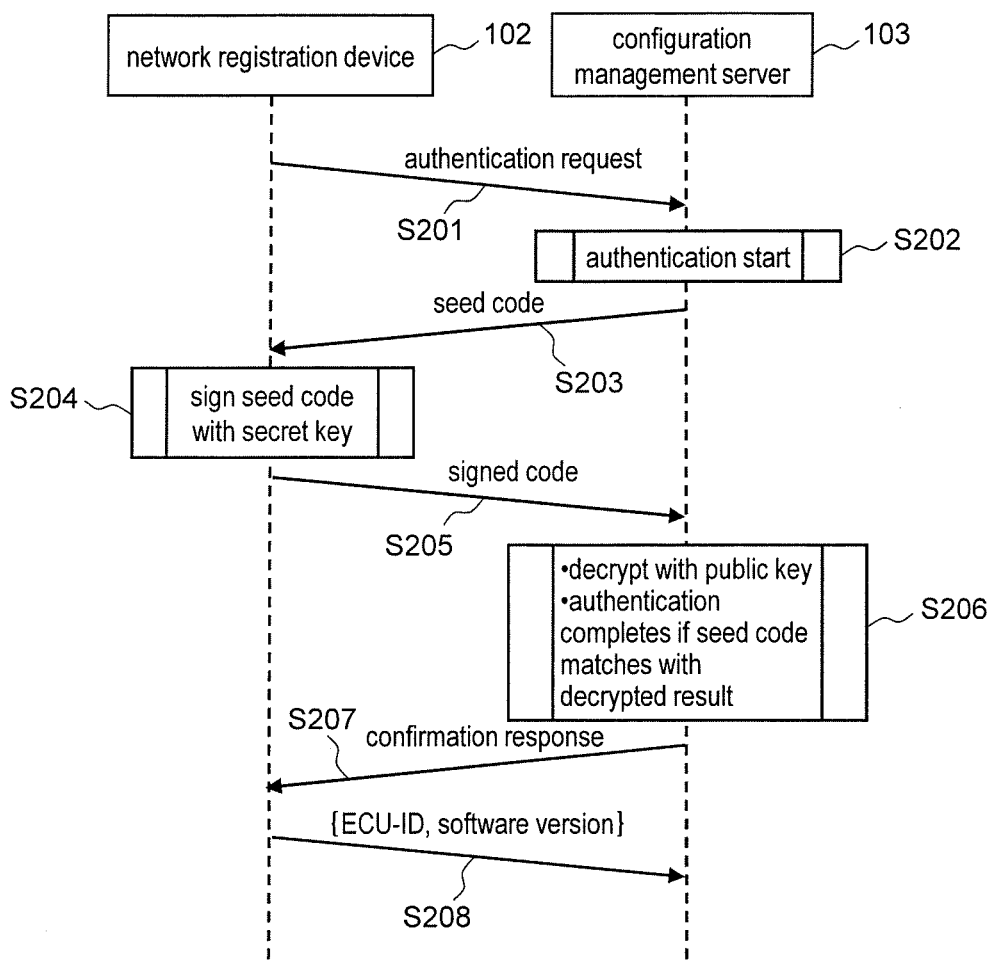
FIG. 2 is a diagram showing a sequence for a configuration management device 103 to authenticate a registration device 102.

FIG. 2 is a diagram showing a sequence for the configuration management server 103 to authenticate the network registration device 102. The authentication sequence of FIG. 2 shows details of step S111 in FIG. 1. A method for authenticating the network registration device 102 using a digital signature based on public key infrastructure will be shown as an example. However, other authentication scheme such as challenge and response authentication may be used. Note that a pair of a public key and a secret key for the network registration device 102 is generated and the public key is distributed to the configuration management server 103 in advance. Hereinafter, each step of FIG. 2 will be described.
(FIG. 2: Step S201)

Before registering the target ECU 101 into the in-vehicle network, such as at the time when the network registration device 102 connects to the in-vehicle network initially, the network registration device 102 requests the configuration management server 103 to authenticate that the network registration device 102 is a legitimate terminal. The network registration device 102 sends its own identification code (or similar information) along with the request to show the information identifying the network registration device 102 uniquely to the configuration management server 103.
(FIG. 2: Step S201: Additional Note)

A "legitimate terminal" in this step means a guarantee that the network registration device 102 is a terminal authenticated by the manufacturer of the car, that the network registration device 102 is not falsified, or that the network registration device 102 is not spoofed by other device. Namely, a legitimate terminal is a terminal that has a valid authorization to let the target ECU 101 join the in-vehicle network.
(FIG. 2: Steps S202-S203)

The configuration management server 103 starts an authentication (S202). Specifically, the configuration management server 103 generates a seed code using pseudo random number and sends the seed code to the network registration device 102 (S203). In addition, the configuration management server 103 specifies the public key corresponding to the network registration device 102 using the identification code received from the network registration device 102 in step S201.
(FIG. 2: Steps S204-S205)

The network registration device 102 signs, using its own secret key, the seed code received from the authentication server in step S203 (S204). The network registration device 102 sends the signed code to the configuration management server 103 (S205).
(FIG. 2: Step S206)

The configuration management server 103 reads out the public key specified in step S202 and decrypts the signed code received from the network registration device 102 in step S205 using the public key. The configuration management server 103 compares the decrypted result with the seed code sent to the network registration device 102 in step S203. If both match with each other, the network registration device 102 is determined to be a legitimate terminal. If both do not match with each other, the network registration device 102 is not authenticated.
(FIG. 2: Steps S207-S208)

The configuration management server 103 sends, to the network registration device 102, a confirmation response indicating that the authentication process is completed (S207). Then the network registration device 102 notifies the configuration management server 103 of {ECU-ID, software version} of the target ECU 101 that is to join the in-vehicle network (S208).

<Embodiment 1: Summary>

As discussed thus far, in the in-vehicle network system 1000 according to the embodiment 1, the configuration management server 103 distributes the attestation key (common key) to the target ECU 101 through the network registration device 102 which authenticity can be validated strictly. Thus the target ECU 101 can easily share the attestation key (common key) without performing high-level calculations such as KPS scheme consuming a lot of computational resources. Therefore, the ECU costs can be suppressed as well as improving the in-vehicle network security.

In addition, in the in-vehicle network system 1000 according to the embodiment 1, the network registration device 102 is not necessarily connected to the in-vehicle network system 1000 constantly. Thus the network registration device 102 can be configured using a high performance device independent from the in-vehicle network system 1000. Therefore, the costs of ECUs constructing the in-vehicle network system 1000 can be suppressed as well as performing robust authentication process between the configuration management server 103 and the network registration device 102. An authentication method which is more robust than that of the authentication process between the configuration management server 103 and the target ECU 101 can be used for the authentication process between the configuration management server 103 and the network registration device 102. Namely, the performance of the network registration device 102 can be higher than that of the target ECU 102, thus a robust authentication process consuming a lot of resources can be performed.

In addition, in the in-vehicle network system 1000 according to the embodiment 1, the configuration management server 103 authenticating the target ECU 101 and the network registration device 102 is placed in the in-vehicle network. Thus it is not necessary for each of the devices to communicate with external devices outside the car to perform authentication, which improves security. Further, the resources for authentication may be aggregated in the configuration management server 103 to suppress costs of other ECUs.

<Embodiment 2>

In an embodiment 2 of the present invention, a specific configuration example of the in-vehicle network system 1000 described in the embodiment 1 will be described.

Hereinafter, the in-vehicle network system 1000 according to the embodiment 2 will be compared with the conventional example (FIG. 3) described in Patent Literature 1 to explain the difference between both configurations and securities.

<Embodiment 2: Conventional Example>

Figure 3:
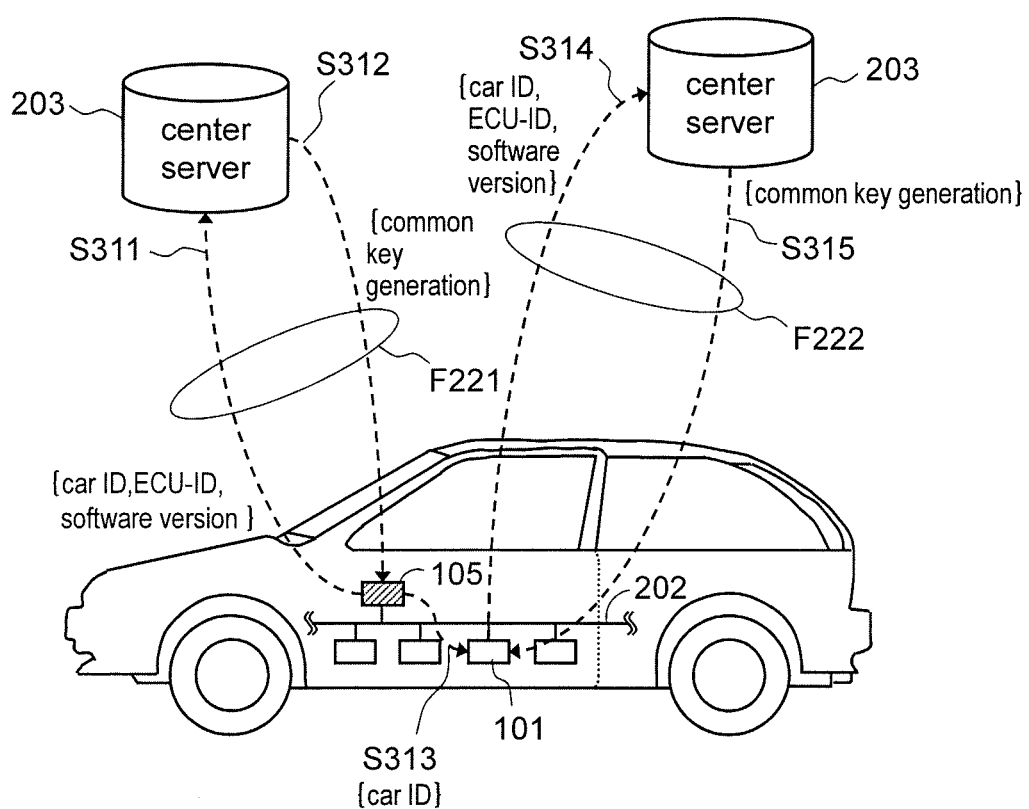
FIG. 3 is a configuration example of an in-vehicle network described in Patent Literature 1.

FIG. 3 is a diagram showing a configuration example of the in-vehicle network described in Patent Literature 1. FIG. 3 is provided for comparison with the embodiment 2. In FIG. 3, an ECU master 105 exists in an in-vehicle network 202. The ECU master 105 has identification numbers {car ID} for each of cars.

The ECU master 105, when performing initialization process, requests the center server 203 installed at outside of the in-vehicle network 202 to distribute {common key generation source} using an information set of {car ID, ECU-ID, software version} (step S311). The ECU-ID is an identifier of the ECU master 105. The software version is a version of software equipped in the ECU master 105.

The center server 203 distributes {common key generation source} in response to the request (step S312). These communications are encrypted using an initialization key mandatorily configured in the ECU master 105 (external communication F221).

The {common key generation source} distributed by the center server 203 is a "information source deriving common key" used only for the communication among ECUs belonging to the in-vehicle network 202.

The target ECU 101 belonging to an in-vehicle network other than that of the ECU master 105 acquires {car ID} from the ECU master 105. At this time, the target ECU 101 has not acquired {common key generation source}, thus the target ECU 101 communicates with the ECU master 105 without encryption (step S313).

The target ECU 101 assembles the set of {car ID, ECU-ID, software version} using the {car ID} received from the ECU master 105 and requests the center server 203 to distribute {common key generation source} (step S314). The ECU-ID is an identifier of the target ECU 101. The software version is a version of software equipped in the target ECU 101.

The center server 203 distributes {common key generation source} in response to the request (step S315). These communications are encrypted using an initialization key mandatorily configured in the target ECU 101 (external communication F222).

According to the above-mentioned configuration, it is obvious that the scheme of Patent Literature 1 has vulnerabilities as below.

(Vulnerability 1)

All ECUs belonging to the in-vehicle network 202 connect to the center server 203 placed at outside of the in-vehicle network 202 to receive {common key generation source} when performing initialization process. Therefore, if the connection between the center server 203 and the ECU when performing the initialization process is interrupted, effective in-vehicle network cannot be constructed.

(Vulnerability 2)

The center server 203 manages the set of {car ID, ECU-ID, software version} for all cars and {common key generation source}. Therefore, if the center server 203 is illegally hacked, all car keys are leaked. In addition, if a failure occurs in the center server 203 regardless of intentionally or negligently, all car keys may be lost.

(Vulnerability 3)

The encrypted communication when performing the initialization process (external processes F221 and F222) is vulnerable. Therefore, when receiving {common key generation source}, the mutual authentication between the ECU and the center server 203 is not secure. This is because the authentication process has to use the fixed encryption key with few varieties due to the constraints of ECU hardware that is mass-manufactured as components. Accordingly, if the encryption key is hacked, key information of specific cars may be leaked from the center server 203 and in-vehicle ECUs may be interrupted when communicating with the in-vehicle network by malignant third parties distributing faked key information.

(Vulnerability 4)

The information flow of {car ID} from the ECU master 105 to the target ECU 101 when performing the initialization process (step S313) is not encrypted. Thus the {car ID} can be easily captured from outside of the in-vehicle network 202. This may lead malignant third parties to analogize the set of {car ID, ECU-ID, software version} (used in steps S311 and S314).

<Embodiment 2: Description of the Present Invention>

Figure 4:
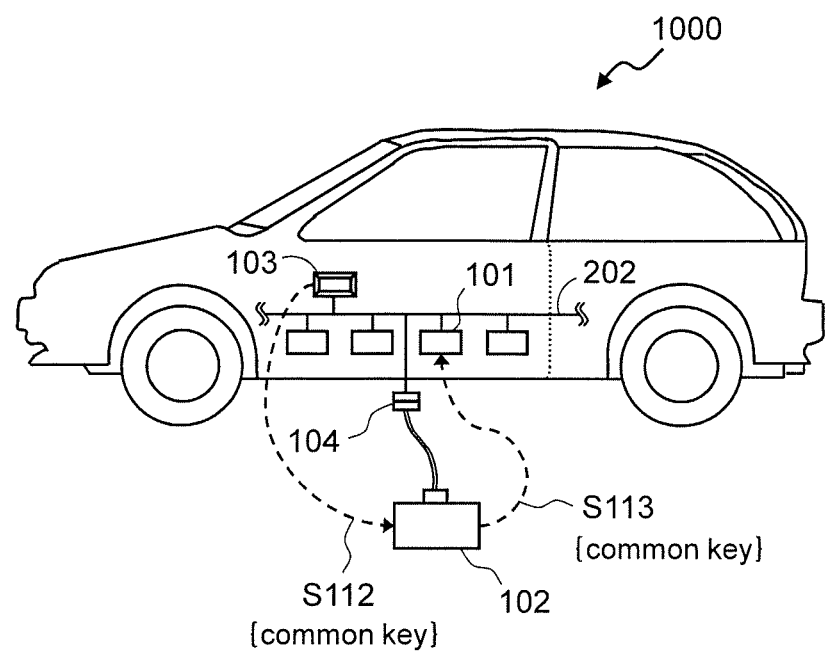
FIG. 4 is a configuration diagram of an in-vehicle network system 1000 according to an embodiment 2.

FIG. 4 is a diagram showing a configuration example of the in-vehicle network system 1000 according to the embodiment 2. The configuration management server 103 is placed in the in-vehicle network 202. A process to let the new target ECU 101 join the in-vehicle network 202 will be described.

An operator connects the network registration device 102 to a car connector 104. The network registration device 102 communicates with the configuration server 103 to be authenticated. The operator inputs, on the network registration device 102, the ECU-ID and the like of the target ECU 101 joining the in-vehicle network 202 and sends them to the configuration management server 103. This process corresponds to step S111 of FIG. 1.

The configuration management server 103 strictly examines and verifies the authenticity of the network registration device 102. If the configuration management server 103 confirms that the network registration device 102 is valid, the configuration management server 103 issues {common key} unique to the target ECU 101 (step S112).

The network registration device 102 relays the {common key} to the target ECU 101 and instructs the target ECU 101 to store it (step S113). The process described above enables sharing the {common key} between the configuration management server 103 and the target ECU 101 securely.

The mechanism described above improves the vulnerabilities of the conventional example as below. The improvements corresponding to the vulnerabilities will be described in the same order as that of the vulnerabilities.

(Improvement 1)

The communication performed by each ECU is enclosed within the in-vehicle network 202 and no communication to external devices outside the car is performed. Therefore, there are few chances for the in-vehicle network 202 to be illegally hacked or to leak information.

(Improvement 2)

The key information in the in-vehicle network 202 is managed by the configuration management server 103 embedded in each of cars. Therefore, there is no vulnerability caused by aggregating information of all cars into the center server 203. In addition, the {common key} is unique to each car. Thus, even if the {common key} is leaked, no security issue occurs for other cars.

(Improvement 3)

The {common key} for performing the initialization process is issued and relayed between the configuration management server 103 and the network registration device 102 where strict mutual authentication is performed. Therefore, there are very few security risks such as interruption by malignant third parties.

(Improvement 4)

The identification information of ECUs joining the in-vehicle network 202 as members thereof, such as {car ID, ECU-ID, software version}, is managed only in the configuration management server 103. Therefore, it is not necessary to disclose the identification information to other ECUs through the in-vehicle network 202. Thus the identification information is robust against leakage risks.

<Embodiment 2: Sharing the Common Key>

The network registration device 102 may be configured as a simple device that only has a function to store the common key information in a non-volatile memory (EEPROM: Electrically Erasable and Programmable Read-Only Memory) of the target ECU 101, or may be configured as a program rewrite device that directly write the common key information in a flash ROM storing control software of the target ECU 101.

If a defect of control program is found out after the car is shipped to the market, car dealers recall the car and rewrite programs of the corresponding in-vehicle ECUs. It is convenient for the operator if the program rewrite device can be used to upgrade the software of target ECU, to update the attestation key (common key), and to update the registration information of the configuration management server 103 (such as ECU-ID, software version) simultaneously. Therefore, it is desirable if the network registration device 102 also has a function as a program rewrite device.

FIG. 4 shows as if the network registration device 102 is directly connected to the in-vehicle network 202. However, the in-vehicle network 202 may be connected to an external network outside the car using signal coupling schemes other than wired communication such as wireless communication and the network registration device 102 may be configured as a member of the external network. Even in this case, the authentication between the configuration management server 103 and the network registration device 102 is strictly performed.

Figure 5:
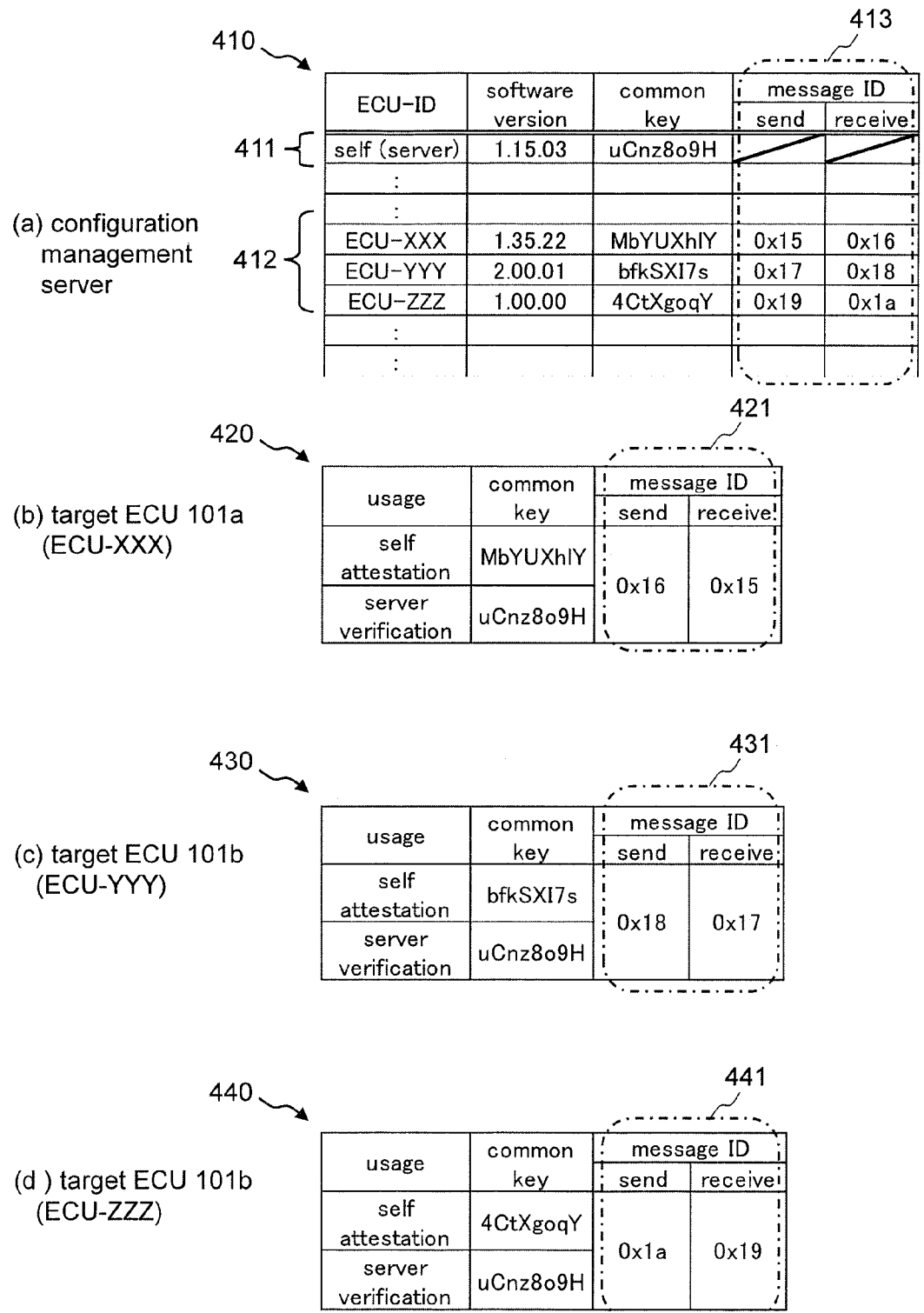
FIG. 5 is a diagram showing an arrangement in which attestation information (common key) is shared between the configuration management device 103 and a target ECU 101.

FIG. 5 is a diagram showing an arrangement (information distribution) in which the attestation information (common key) is shared between the configuration management server 103 and the target ECU 101. This example includes multiple target ECUs 101.

FIG. 5 (a) shows a data example stored in a database 410 in the configuration management server 103. The identification information (such as ECU-ID, software version) of each in-vehicle ECU is stored as shown with data 412. The data 411 is an authentication key for the configuration management server itself and is distributed to all in-vehicle ECUs equally.

Databases 420, 430, and 440 shown in FIGS. 5 (b)-(d) show data examples of the attestation key (common key) stored in memories of the target ECUs 101a-101c respectively. The common keys stored in each target ECU 101 are issued by the configuration management server 103 and are configured through the network registration device 102.

Namely, the information in data 412 stored in the database 410 of the configuration management server excluding ECU-IDs and software versions is copied to each target ECU 101. This common key is key information used for each of the target ECUs 101 to prove their authenticity to the configuration management server 103. Hereinafter, this information is referred to as "ECU key".

In addition, the common key information in the data 411 stored in the database 410 of the configuration management server excluding ECU-ID and software version is copied to each target ECU 101. This common key is key information used for the configuration management server 103 to prove its authenticity to each of the target ECUs 101. Hereinafter, this information is referred to as "server key".

In addition to the ECU key and the server key, communication identification information 413 such as channel numbers or message IDs used when the configuration management server 103 and each of target ECUs 101 communicate with each other may be distributed to each of target ECUs 101.

The communication identification information 413 is information specifying types of communication data. For example, the types may be used in various purposes such as: the message ID "0x15" is used when the configuration management server 103 sends the common key to the target ECU 101a; the message ID "0x17" is used when the configuration management server 103 sends the common key to the target ECU 101b. Each of the target ECUs 101 can identify what is described in the received data using the message ID.

Each of the target ECUs 101 does not identify communication channels used in the attestation before joining the in-vehicle network 202. Thus the message ID may be distributed to each target ECU 101 along with the attestation key (common key). The message IDs are stored in databases of each target ECU as data 421, 431, and 441.

The confidentiality of communication becomes much higher by changing the message ID for each type of communication data. Namely, since malignant third parties do not know what message ID is used for distributing the common key, it is difficult for the third parties to extract the common key among communication data.

In addition to the above-mentioned information, attribute information such as ECU-IDs or software versions stored in the database 410 of the configuration management server may be distributed to each target ECU 101. The information is useful for the network registration device 102 and the target ECUs 101.

The network registration device 102 may want to inspect what ECUs or what software are used to configure the car system. In addition, an in-vehicle ECU may want to inspect whether its control software corresponds to software versions of other in-vehicle ECUs destined when performing harmonized control. In order to satisfy such requests, the configuration management server 103 may distribute such information stored in the database 410 to the network registration device 102 or the target ECUs 101.

However, in terms of security, such information would be disclosed after the strict authentication is performed with respect to the network registration device 102 and after the attestation is performed with respect to the in-vehicle ECUs.

The database 410 shown in FIG. 5 may be configured so that an operator can view and update its contents using the network registration device 102. As in the attestation, the network registration device 102 is authenticated by the configuration management server 103 before viewing or updating the database 410.

<Embodiment 2: Generating the Common Key>

Figure 6:
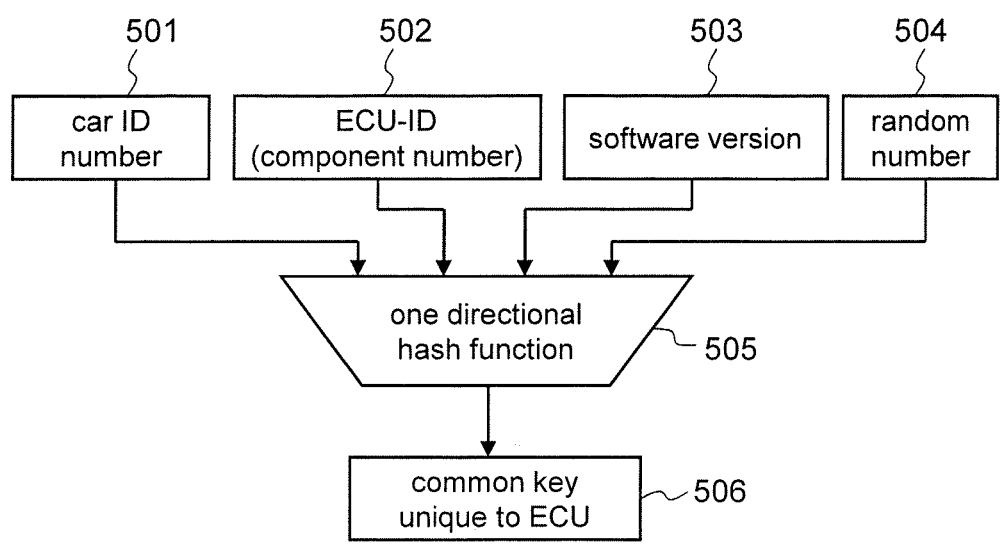
FIG. 6 is a diagram showing a method for the configuration management device to generate the attestation key (common key).

FIG. 6 is a diagram showing a method for the configuration management server 103 to generate the attestation key (common key). Hereinafter, the process for generating the attestation key will be described according to FIG. 6.

The car ID number 501 is a number uniquely assigned to each car and is stored internally by the configuration management server 103. The ECU-ID (component number) 502 and the software version 503 are an ECU-ID (component number) and a software version of the target ECU 101 joining the in-vehicle network 202. The random number 504 is a random number generated in the configuration management server 103. For example, a device generating uniform random numbers using white-noise-like fluctuation of semiconductor threshold may be used to generate the random number 504. For another example, numerical sequences captured from free run counter of microcomputer at any timing may be employed as the random number 504, as a simplified implementation.

The configuration management server 103 inputs these values into the one directional hash function 505. The one directional hash function 505 outputs a fixed-length common key 506 unique to the ECU. The common key 506 or a value calculated from the common key 506 can be used as the attestation key.

The one directional hash function 505 is used so that information such as the car ID number 501, the ECU-ID (component number) 502, or the software version 503 cannot be recovered from the common key 506 unique to the ECU. In addition, it is also important that the common key 506 varies even if the input value is slightly changed, that the generated value is hardly to conflict, and that the combination of input values providing the same output value is unpredictable.

Since the car ID number 501 is used as an input value to the one directional hash function 505, the common key 506 is different for each car even if the target ECU 101 with the same ECU-ID (component number) 502 is registered in the network. In addition, since the random number 504 is used as an input value to the one directional hash function 505, the common key 506 is different for each joining process even if an in-vehicle ECU with the same ECU-ID (component number) 502 and with the same software version 503 joins the in-vehicle network 202 in the same car.

This scheme improves the capability to detect falsification of ECUs or illegal exchange of ECUs. Functions other than the one directional hash function may be used as long as the same effect is achieved. However, in terms of configuring the original value unpredictable from the common key 506, one directional functions are desirable.

<Embodiment 2: Attestation Process>

Figure 7:
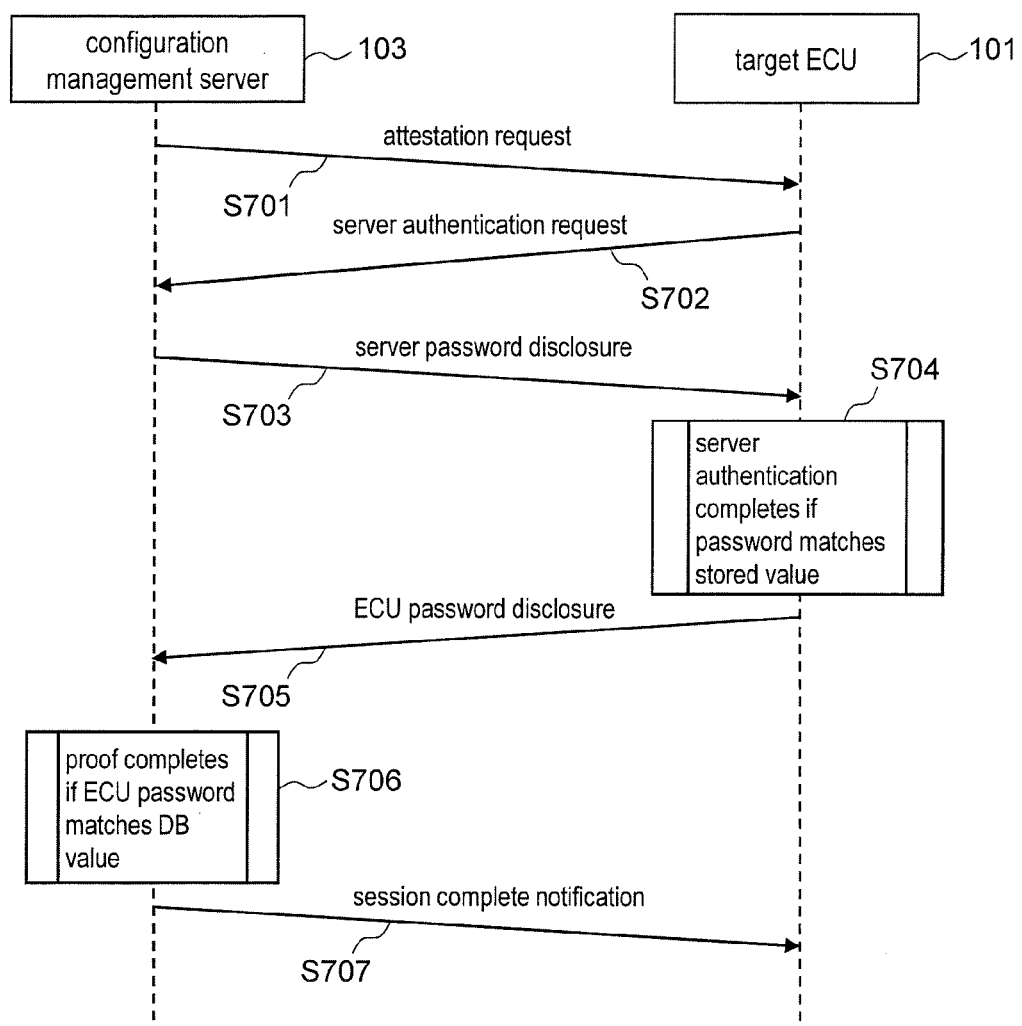
FIG. 7 is a sequence diagram showing a process for the configuration management device 103 to authenticate the target ECU 101.

FIG. 7 is a sequence diagram showing a process for the configuration management server 103 to authenticate the target ECU 101. An example is shown where the server key and the ECU key mentioned above are used as a password. Hereinafter, each step of FIG. 7 will be described.

(FIG. 7: Steps S701-S702: Start Attestation)

The configuration management server 103 sends an attestation request to the target ECU 101 (S701). This attestation request may be performed when the car is in a specific state (such as immediately after initiation, in idling, or immediately after turning off the ignition) or may be performed periodically. The target ECU 101 responds a server authentication request to check whether the requester is really the valid configuration management server 103 (S702).

(FIG. 7: Steps S701-S702: Additional Note)

If the communication identification information 413 is distributed along with the attestation key (common key), the communication sequence shown in FIG. 7 is performed using communication channels or message IDs stored in each ECU.

(FIG. 7: Steps S703-S704: Authentication on Server Side)

In order to indicate the authenticity of the configuration management server 103 to the target ECU 101, the configuration management server 103 discloses the server key as a server password (S703). If the server key matches with the server key stored in the target ECU 101, the configuration management server 103 is proved of its authenticity (S704).

(FIG. 7: Steps S705-S707: Authentication on ECU Side)

If the target ECU 101 confirms the configuration management server 103's authenticity, the target ECU 101 sends the ECU key to the configuration management server 103 as an ECU password (S705). If the key stored in the database 410 matches with the received ECU key, the configuration management server 103 determines that the target ECU 101 is not falsified (S706). The attestation is completed according to the process described above. The configuration management server 103 sends a session complete notification to the target ECU 101 (S707).

<Embodiment 2: Attestation Process No. 2>

According to the process described in FIG. 7, the server authentication and the attestation can be easily performed. However, the server key and the ECU key flow through the in-vehicle network 202. If these keys are captured, it is possible to create a falsified target ECU 101 (or configuration management server 103) to connect to the in-vehicle network 202.

In order to prevent such circumstances to improve security, the attestation key may be used as a common key in challenge and response authentication instead of communicating the attestation key (common key) directly through the in-vehicle network 202. Such process will be described using FIG. 8.

Figure 8:
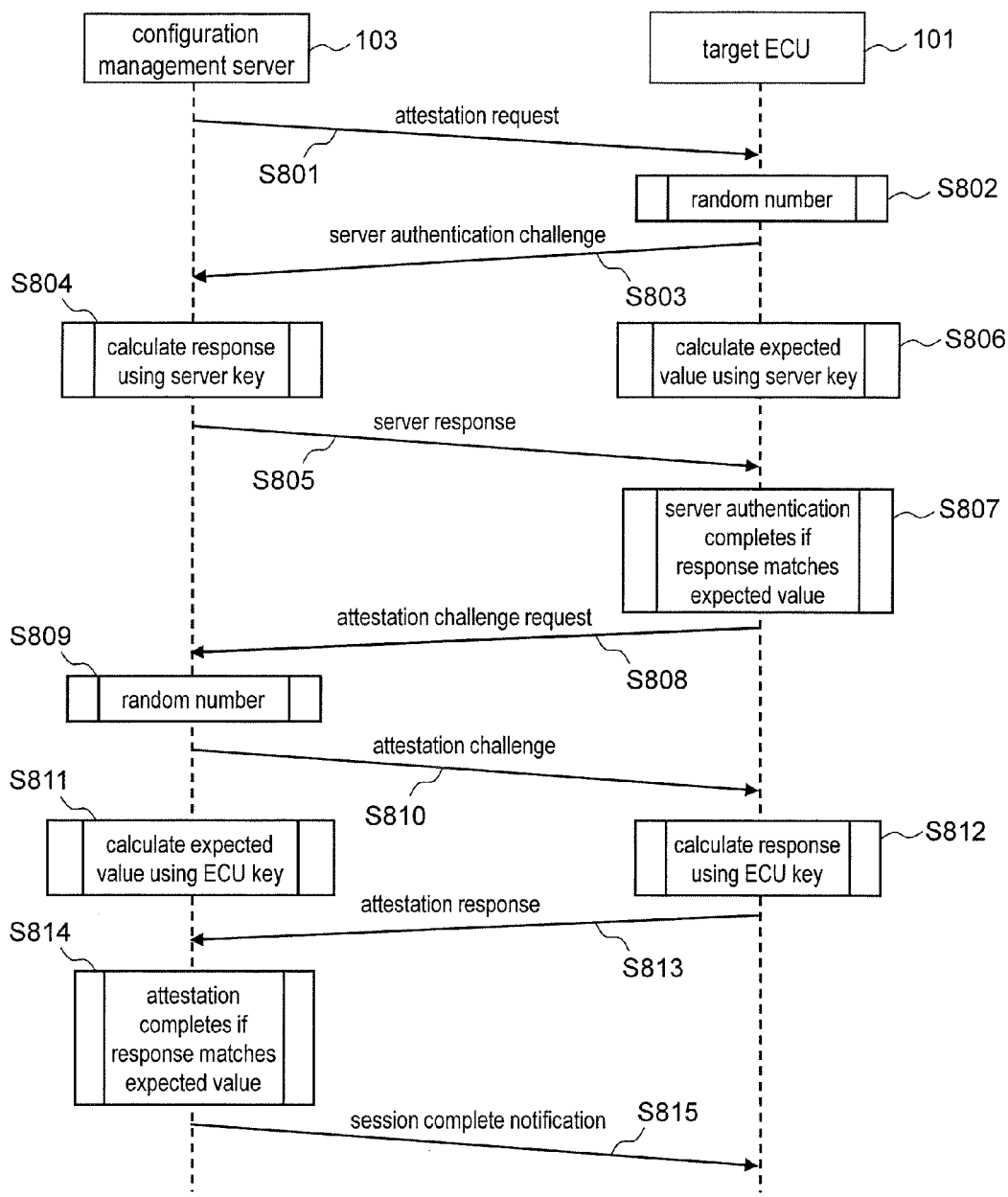
FIG. 8 is a sequence diagram showing another process for the configuration management device 103 to authenticate the target ECU 101.

FIG. 8 is a sequence diagram showing another process for the configuration management server 103 to authenticate the target ECU 101. Hereinafter, each step in FIG. 8 will be described.

(FIG. 8: Step S801: Attestation Request)

The configuration management server 103 sends an attestation request to the target ECU 101 (S801). This attestation request may be performed when the car is in a specific state (such as immediately after initiation, in idling, or immediately after turning off the ignition) or may be performed periodically. The target ECU 101 starts an authentication to check whether the requester is the valid configuration management server 103.

(FIG. 8: Step S802-S803)

The target ECU 101 generates a random number (S802), and sends it to the configuration management server 103 as challenge data for server authentication (S803).

(FIG. 8: Step S804-S805)

The configuration management server 103 receives the challenge data for server authentication in step S803 and calculates a response using an one directional hash function employing the challenge data and the server key as inputs (S804). The configuration management server 103 sends the calculated response to the target ECU 101 as a server response (S805).

(FIG. 8: Step S806)

The target ECU 101 inputs the random number generated in step S802 and the server key shared between the configuration management server 103 into an one directional hash function to calculate an expected value that is estimated to return from the configuration management server 103 as the response. The configuration management server 103 and the target ECU 101 are assumed to employ the one directional hash function using the same algorithm according to rules. Thus the output values from the one directional hash function using the same data as inputs are expected to be identical.
(FIG. 8: Step S807-S808)

The target ECU 101 compares the value calculated in step S806 with the value received from the configuration management server 103 (S807). If both values are identical, the authenticity of the configuration management server 103 is proved. Thus the target ECU 101 sends a challenge request for attestation to the configuration management server (S808).
(FIG. 8: Step S809-S810)

The configuration management server 103, upon receiving the challenge request for attestation sent by the target ECU 101 in step S808, generates a random number (S809). The configuration management server 103 sends the random number to the target ECU 101 as the challenge data for attestation (S810). The means for generating random number is the same as that of the target ECU 101.
(FIG. 8: Step S811-S813)

The configuration management server 103 calculates an expected value of the response using the challenge data sent in step S810 and the ECU key according to the process as in step S806 (S811). The target ECU 101 calculates the response using the challenge data sent by the configuration management server 103 in step S810 and the ECU key according to the process as in step S804 (S812). The target ECU 101 sends the calculated response to the configuration management server 103 (S813).
(FIG. 8: Step S814-S815)

The configuration management server 103 compares the response for attestation sent from the target ECU 101 in step S813 with the expected value calculated in step S811. If both are identical, the target ECU 101 is attested (S814). The configuration management server 103 then sends a session complete notification to the target ECU 101 (S815).

<Embodiment 2: Summary>

As discussed thus far, in the in-vehicle network system 1000 according to the embodiment 2, the configuration management server 103 manages identification information of all in-vehicle ECUs (such as ECU-ID (component number), software version). This management scheme does not use external servers aggregating information of all cars and is configured as distributed control in which each car stores own identification information individually. Therefore, the information management scheme is robust and thus security crisis does not spread to all cars even if the configuration management server 103 for each car is hacked.

In addition, in the in-vehicle network system 1000 according to the embodiment 2, the reliable network registration device 102 may help distributing the attestation key (common key) securely when the target ECU 101 joins the in-vehicle network 202. This allows the configuration management server 103 and the target ECU 101 to mutually authenticate to prove the authenticity of configuration each other using the above-described simple challenge and response authentication.

In addition, in the in-vehicle network system 1000 according to the embodiment 2, it is not necessary to use sophisticated encrypted communication (common key encryption or public key encryption) or common key distribution techniques (such as KPS scheme) when performing attestation. Namely, it is not necessary to consume the computational resources such as CPU/ROM/RAM in existing ECUs for the attestation, thus the implementation costs will not increase.

Therefore, the present invention is excellent in cost performance as a method for adding attestation function to the in-vehicle network system 1000 and for addressing ECU falsifications.

<Embodiment 3>

Figure 9:
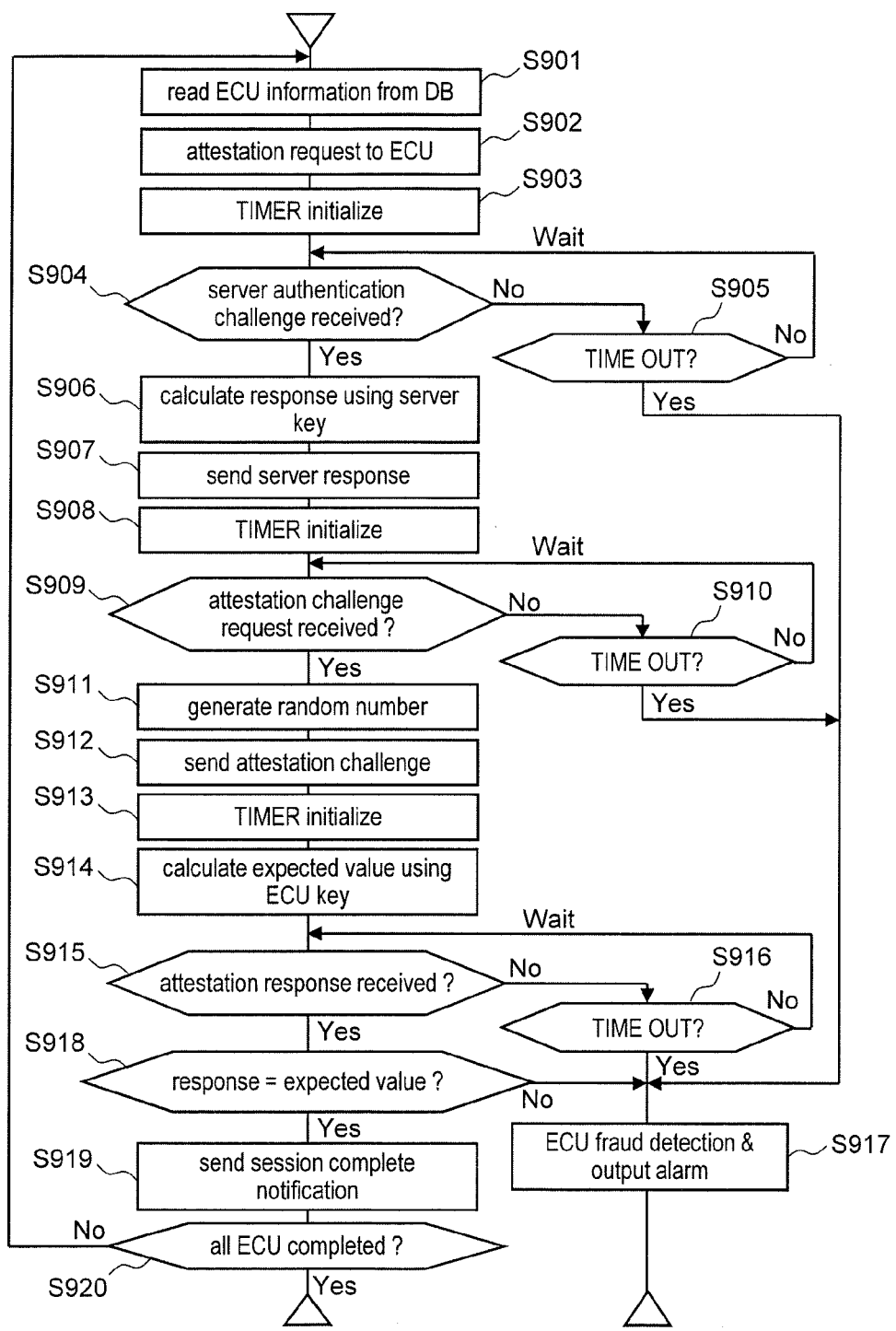
FIG. 9 is a flowchart showing a process executed in the configuration management device 103.
Figure 10:
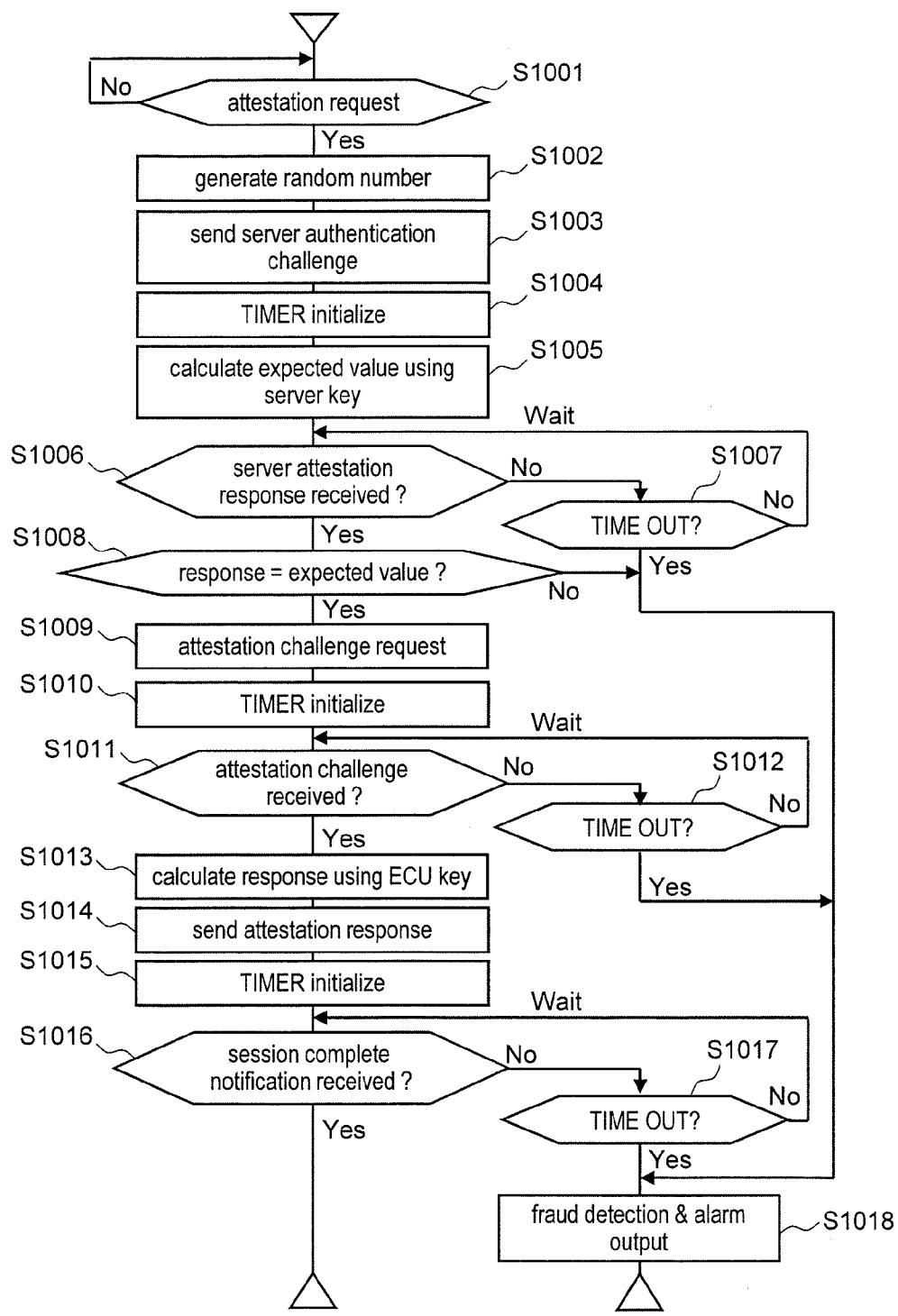
FIG. 10 is a flowchart showing a process executed in the target ECU 101.

In an embodiment 3 of the present invention, a specific software implementation of the in-vehicle network system 1000 described in the embodiment 2 will be described. FIGS. 9 and 10 are flowcharts of software implementation for the attestation process using challenge and response scheme shown in FIG. 8. Thus FIGS. 9 and 10 are not functionally equivalent to the sequence of FIG. 8 completely and those figures include error handling steps and alarming steps in diagnosis errors.

FIG. 9 is a flowchart showing a process executed in the configuration management server 103. Hereinafter, each step of FIG. 9 will be described.
(FIG. 9: Steps S901-S905: Attestation Start)

The configuration management server 103 reads out, from the database 410, the common key of the target ECU 101 to be verified for preparation of attestation (S901). The configuration management server 103 then sends an attestation request to the corresponding target ECU 101 (S902), and initializes a timer for measuring timeout (S903). The configuration management server 103 waits for challenge data for server authentication (S904). If the challenge data is received, the process proceeds to step S906. If the configuration management server 103 determines that the process times out because the challenge data for server authentication is not received (S905), the configuration management server 103 determines that the target ECU 101 is not responding and the process proceeds to step S917.
(FIG. 9: Steps S906-S910: Server-Side Authentication)

The configuration management server 103, upon receiving a challenge data for server authentication, calculates a response using the server key (S906), and sends the response to the target ECU 101 (S907). The configuration management server 103 then initializes a timer for measuring timeout in order to wait for the ECU's determination (S908). The configuration management server 103 waits for a challenge request for attestation from the target ECU 101 (S909). If the configuration management server 103 receives the request, it indicates that the target ECU 101 accepts the server authentication, and thus the process proceeds to step S911. If the configuration management server 103 does not receive the challenge request for attestation and determines that the process times out (S910), the configuration management server 103 determines that the target ECU 101 may not accept the server authentication or may not know the procedure because of being falsified, and the process proceeds to step S917.
(FIG. 9: Steps S911-S916: ECU-Side Attestation Request)

Steps S911-S916 are steps to prepare data for performing attestation of the target ECU 101. The configuration management server 103 generates a random number (S911), and sends the random number to the target ECU 101 as challenge data for attestation (S912). The configuration management server 103 then initializes a timer for measuring timeout (S913). The configuration management server 103 calculates an expected value of response using the ECU key of the target ECU 101 that is already searched in step S901 (S914). The configuration management server 103 waits for a response for attestation from the target ECU 101 (S915). If the configuration management server 103 receives the response, the process proceeds to step S918. If the configuration management server 103 does not receive the response and determines that the process times out (S916), the configuration management server 103 determines that the target ECU 101 may not know the procedure because of being falsified, and the process proceeds to step S917.

(FIG. 9: Steps S917: ECU Fraud Detection & Alarming)

The configuration management server 103, through appropriate interfaces, outputs an alarm signal indicating that the target ECU 101 is falsified or broadcasts communication data describing about it to the in-vehicle network 202.

(FIG. 9: Steps S918-S920: Attestation Result)

The configuration management server 103 compares the expected value calculated in step S914 with the response for attestation received from the target ECU 101 (S918). If both are identical, it indicates that the attestation is completed, and thus the configuration management server 103 sends a session complete notification to the target ECU 101 to notify that the attestation is completed (S919). The configuration management server 103 then checks whether the attestation is completed for all of in-vehicle ECUs to be inspected (S920). If completed, the process of FIG. 9 is terminated. If not completed, the process returns to step S901. If the expected value does not match with the response for attestation, the configuration management server 103 determines that the target ECU 101 may be exchanged to that of other car or may be connected to the in-vehicle network 202 without performing the process to join the in-vehicle network 202, namely may be illegally falsified, and the process proceeds to step S917.

FIG. 10 is a flowchart showing a process executed in the target ECU 101. Hereinafter, each step of FIG. 10 will be described.

(FIG. 10: Steps S1001-S1007: Start Server-Side Attestation)

The target ECU 101 waits for an attestation request from the configuration management server 103, and proceeds to step S1002 upon receiving the request (S1001). The target ECU 101 generates a random number in order to check whether the target ECU 101 is falsified (whether the target ECU 101 is a malignant eavesdropping device) (S1002), and sends the random number as challenge data for server authentication (S1003). The target ECU 101 initializes a timer for measuring timeout (S1004). The target ECU 101 calculates an expected value of response from the configuration management server 103 using the server key (S1005). The target ECU 101 waits for a response for server authentication from the configuration management server 103 (S1006). Upon receiving the response, the process proceeds to step S1008. If the target ECU 101 does not receive the response for server authentication and determines that the process times out (S1007), the target ECU 101 determines that the configuration management server 103 may be falsified or may be exchanged to a malignant eavesdropping device, and the process proceeds to step S1018.

(FIG. 10: Steps S1008-S1012: Start ECU-Side Attestation)

The target ECU 101 compares the expected value calculated in step S1005 with the response for server attestation received from the configuration management server 103 (S1008). If both are identical, it indicates that the authenticity of the configuration management server 103 is confirmed, and thus the process proceeds to step S1009. If the expected value does not match with the response for server attestation, the target ECU 101 determines that the configuration management server 103 may be exchanged to that of other car or may be illegally falsified, and the process proceeds to step S1018. The target ECU 101 requests the configuration management server 103 to send challenge data for attestation to prove the configuration management server 103's authenticity (S1009). The target ECU 101 then initializes a timer measuring timeout in order to wait for challenge data for attestation from the configuration management server 103 (S1010). The target ECU 101 waits for challenge data for attestation from the configuration management server 103. Upon receiving the response, the process proceeds to step S1013. If the target ECU 101 does not receive the challenge data for attestation and determines that the process times out (S1012), the target ECU 101 determines that the configuration management server 103 may not know the procedure because of being falsified, and the process proceeds to step S1018.

(FIG. 10: Steps S1013-S1017: Attestation Result)

The target ECU 101 calculates a response using the challenge data for attestation received from the configuration management server 103 and the ECU key (S1013), and sends the response to the configuration management server (S1014). In addition, the target ECU 101 initializes a timer for measuring timeout in order to monitor the response from the configuration management server 103 (S1015). The target ECU 101 waits for a session complete notification from the configuration management server 103. Upon receiving the response, since it indicates that the configuration management server 103 completes the attestation, the process of FIG. 10 terminates (S1016). If the target ECU 101 does not receive the challenge data for attestation and determines that the process times out (S1017), the target ECU 101 determines that the configuration management server 103 may be exchanged to that of other car or may be illegally falsified, and the process proceeds to step S1018.

(FIG. 10: Steps S1018: Configuration Management Server Fraud Detection & Alarming)

The target ECU 101, through appropriate interfaces, outputs an alarm signal indicating that the configuration management server 103 is falsified or broadcasts communication data describing about it to the in-vehicle network 202.

<Embodiment 3: Summary>

As discussed thus far, in the in-vehicle network system 1000 according to the embodiment 3, the attestation is performed by the mutual authentication between the configuration management server 103 and the target ECU 101. This enables detecting that the configuration management server 103 or the target ECU 101 is falsified and an alarm indicating it can be issued.

<Embodiment 4>

Figure 11:
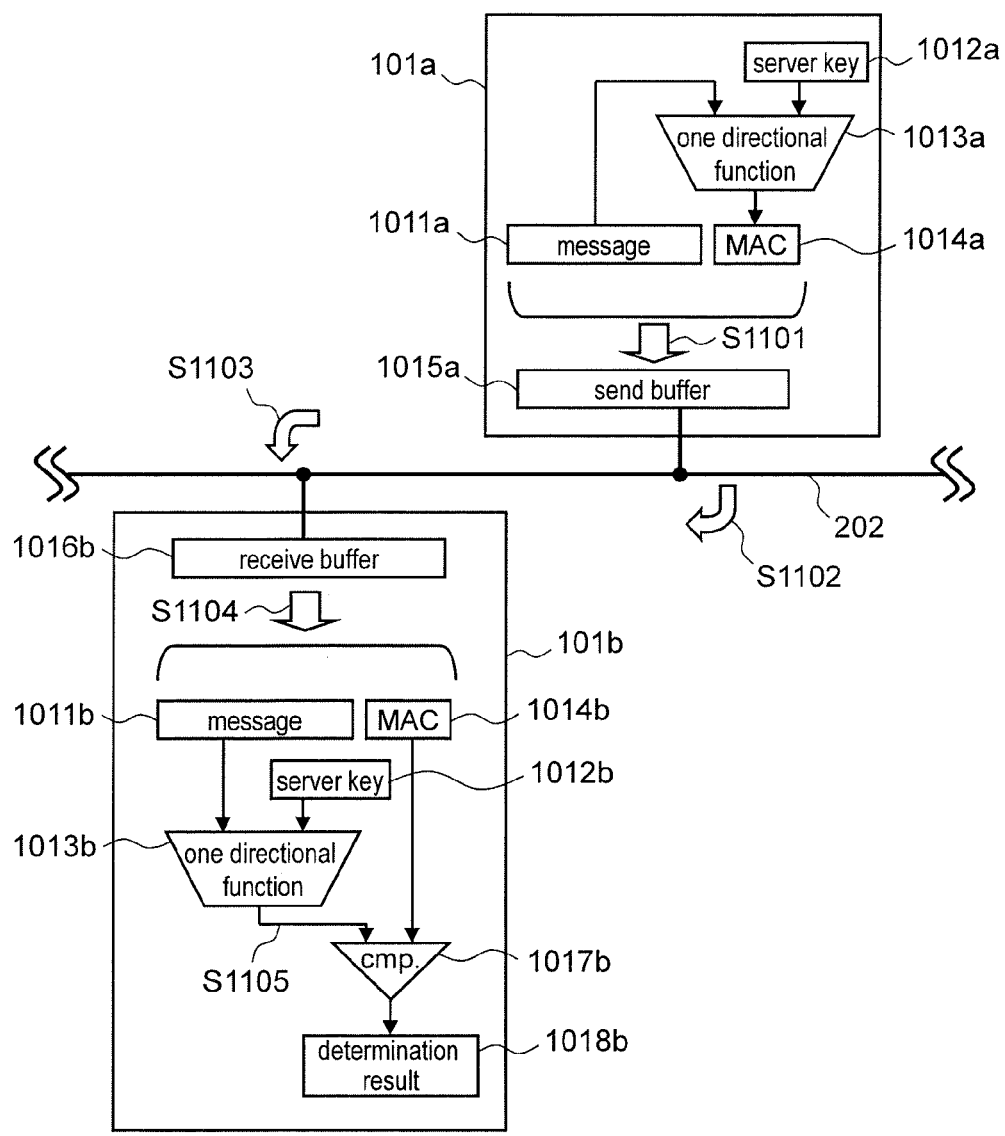
FIG. 11 is a diagram showing an operational example in which the attestation method described in the embodiments 1-3 is applied to an application other than attestation.

FIG. 11 is a diagram showing an operational example in which the attestation method described in the embodiments 1-3 is applied to an application other than attestation. FIG. 11 assumes that there are two ECUs 101 (ECUs 101a and 101b) and a message with digital signature is transmitted between the ECUs.

The ECU key is shared only in the pairs of the configuration management server 103 and in-vehicle ECUs. On the other hand, the server key is shared among multiple in-vehicle ECUs. Therefore, the server key may be used to transmit a message authentication code (MAC) among multiple in-vehicle ECUs to assure the authenticity of the message.

The server key is securely distributed from the configuration management server 103 when the target ECU 101 joins the in-vehicle network 202. Thus the server key is not leaked to ECUs other than valid ECUs belonging to the in-vehicle network 202. Therefore, other ECUs can confirm that the message is from an in-vehicle ECU authenticated by the configuration management server 103 by performing digital signing (attaching a message authentication code) using the server key.

The ECU 101a inputs a sending message 1011a and a server key 1012a into a one directional hash function 1013a to generate a message authentication code (MAC) 1014a. The ECU 101*a* packs the message 1011*a* and the message authentication code (MAC) 1014*a* (S1101) and stores the package into a send buffer 1015*a*. Then the ECU 101*a* sends out the buffered data to the in-vehicle 202 (S1102).

The ECU 101*b* receives the signal sent by the ECU 101*a* (S1103) and stores it in a receive buffer 1016*b*. The ECU 101*b* unpacks the buffered data according to the rule agreed with the sender (S1104) to separate the data into a message 1011*b* and a message authentication code (MAC) 1014*b*.

The ECU 101*b* inputs the message 1011*b* and a server key 1012*b* (assumed to be identical to the server key 1012*a*) into a one directional hash function 1013*b* to generate a receiver-side message authentication code (MAC) (S1105). The ECU 101*b* compares the MAC 1014*b* with the receiver-side message authentication code (MAC) using a comparator 1017*b*. If the ECU 101*b* acquires a determination result 1018*b* indicating that both are identical, the ECU 101*b* can determine that the content of message 1011*b* is generated by the ECU 101*a* and is not falsified during transmission.

Note that the one directional hash functions 1013*a* and 1013*b* employ the same algorithm according to the rule between the ECUs.

FIG. 11 shows an implementation in which the message authentication code (MAC) is implemented using the server keys commonly stored by ECUs that are properly registered into the in-vehicle network 202 by the network registration device 102. However, the application is not limited to message authentication code. The implementation may be applied to encrypted communications between in-vehicle ECUs using common key encryption (such as DES scheme or AES (Advanced Encryption Standard) scheme).

<Embodiment 4: Summary>

As discussed thus far, the method for sharing the common key between in-vehicle ECUs according to the present invention is effective for attestation as well as for any type of highly reliable communication between in-vehicle ECUs.

<Embodiment 5>

Figure 12:
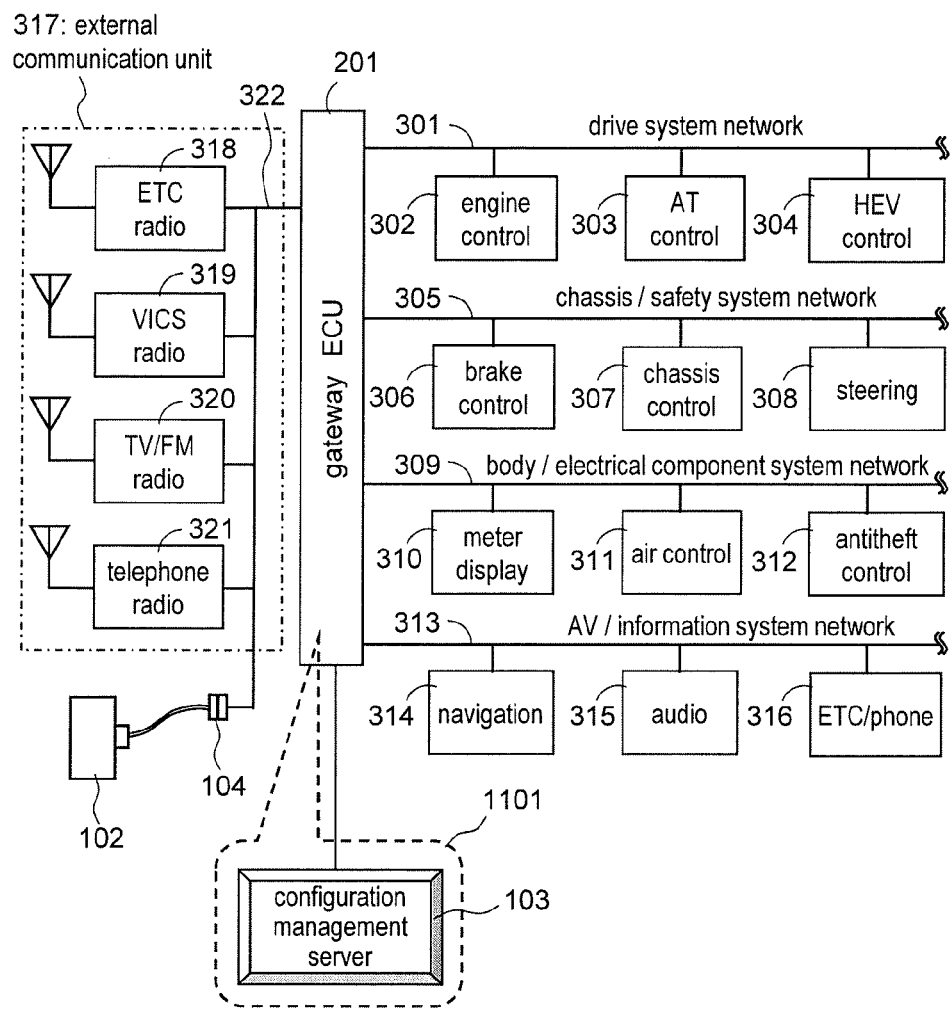
FIG. 12 is a diagram showing a network topology example of an in-vehicle network included in recent representative highly-functional cars.

FIG. 12 is a diagram showing a network topology example of an in-vehicle network included in recent representative highly functionalized cars. The configurations and operations of the network registration device (also works as software rewrite device) 102, the configuration management server 103, and each of ECUs are the same as those of embodiments 1-4.

In FIG. 12, four networks are equipped and each of the networks is bundled by a communication gateway (gateway ECU) 201. FIG. 12 employs a star-type network arrangement with the gateway ECU 201 at the center of the star. However, multiple of the gateway ECUs 201 may be provided to configure a cascade-type network.

The in-vehicle network shown in FIG. 12 includes a drive system network 301, a chassis/safety system network 305, a body/electrical component system network 309, and an AV/information system network 313.

An engine control ECU 302, an AT (Automatic Transmission) control ECU 303, and a HEV (Hybrid Electric Vehicle) control ECU 304 are connected to the drive system network 301. A brake control ECU 306, a chassis control ECU 307, and a steering control ECU 308 are connected to the chassis/safety system network 305. A meter display ECU 310, an air conditioner control ECU 311, and an antitheft control ECU 312 are connected to the body/electrical components system network 309. A navigation ECU 314, an audio ECU 315, and an ETC/phone ECU 316 are connected to the AV/information system network 313.

In addition, in order to transmit information between the car and external devices, an external communication unit 317 is connected to the gateway ECU 201 through an external information network 322. An ECT radio 318, a VICS (registered trademark) (Vehicle Information and Communication System) radio 319, a TV/FM radio 320, and a telephone radio 321 are connected to the external communication unit 317.

The network registration device 102 is configured to connect, through a car connector 104 equipped in the car, to the external information network 322 as a node thereof. Alternatively, the network registration device 102 may connect to other networks (the drive system network 301, the chassis/safety system network 305, the body/electrical component system network 309, the AV/information system network 313) or to the gateway ECU 201 alone. Namely, regardless of the mechanical arrangement, it is sufficient if electrical signals can reach the target ECU directly or through the gateway device 201.

The function of the network registration device 102 may be performed from the external network remotely through the telephone radio 321. For example, applications such as searching the databases in the configuration management server 103 or maintaining the attestation data in the target ECU 101 may be assumed. In such cases, the same method as in the embodiments 1-4 may be used.

The method for rewriting software of ECUs through telephone networks or through the Internet is an important technique for reducing costs of addressing failures such as recalling. Thus such method may be common in some future.

Therefore, using the technique disclosed herein after rewriting the software, the databases in the configuration management server 103 can be updated remotely and the in-vehicle ECUs after rewriting the software can be properly re-registered to the network.

In FIG. 12, the configuration management server 103 is directly connected to the gateway ECU 201. However, any network location of the configuration management server 103 is allowed. Namely, as long as a connection with electrical signals is established, the configuration management server 103 may directly connect to other networks (the drive system network 301, the chassis/safety system network 305, the body/electrical component system network 309, the AV/information system network 313).

However, it is desirable if the gateway ECU 201 works as the configuration management server 103 in terms of two points below.

(1) If the authentication sequence S111 in FIG. 1 fails, the communication from the network registration device 102 can be electrically separated from the in-vehicle network (the drive system network 301, the chassis/safety system network 305, the body/electrical component system network 309, the AV/information system network 313) to which the target ECU 101 belongs. This configuration may be used to add a firewall function to the gateway ECU 201. Thus hacking risks from external devices to the in-vehicle network can be reduced, thereby further improving the security.

(2) It is necessary to prevent from removing the configuration management server 103 from the in-vehicle network for the purpose of illegal modification or falsification of specific in-vehicle ECUs. In terms of such objectives, it is desirable if the gateway ECU 201 and the configuration management server 103 are functionally unified into one ECU. This is because mutual communication among multiple in-vehicle networks cannot be performed if the configuration management server 103 is removed.

As discussed thus far, the present invention is specifically described according to the embodiments. However, the present invention is not limited to the aforementioned embodiments. Various modifications are possible as long as the spirit of the present invention is not departed.

All of or parts of the configurations, functions, or processing units may be achieved as hardware by designing them with integrated circuits, for example, or may be achieved as software by processors executing programs implementing those functions. Information such as programs or tables implementing the functions may be stored in storage devices such as memories or hard disks, or in storage media such as IC cards or DVDs.

REFERENCE SIGNS LIST

101: target ECU
102: network registration device
103: configuration management server
104: car connector
201: communication gateway
202: in-vehicle network
301: drive system network
302: engine control ECU
303: AT control ECU
304: HEV control ECU
305: chassis/safety system network
306: brake control ECU
307: chassis control ECU
308: steering control ECU
309: body/electrical component system network
310: meter display ECU
311: air conditioner control ECU
312: antitheft control ECU
313: AV/information system network
314: navigation ECU
315: audio ECU
316: ECT/phone ECU
317: external communication unit
318: ETC radio
319: VICS radio
320: TV/FM radio
321: telephone radio
322: external information network
1000: in-vehicle network system

The invention claimed is:

1. An in-vehicle network system comprising:
an in-vehicle control unit that controls an operation of a car; and
a configuration management device that authenticates whether the in-vehicle control unit has a valid authorization to join an in-vehicle network of the car;
wherein upon receiving, from a registration device that lets the in-vehicle control unit join the in-vehicle network, a registration request requesting to let the in-vehicle control unit join the in-vehicle network, the configuration management device performs an authentication with respect to the registration device, generates attestation data unique to the in-vehicle control unit, and sends the attestation data to the registration device,
wherein the registration device is configured as a device connected to the in-vehicle network only when the registration device lets the in-vehicle unit join the in-vehicle network, and receives the attestation data from the configuration management device and relays the attestation data to the in-vehicle control unit,
wherein the in-vehicle control unit receives the attestation data from the registration device and stores the attestation data in a memory, and
wherein the configuration management device authenticates the in-vehicle control unit using the attestation data.

2. The in-vehicle network system according to claim 1, wherein the configuration management device authenticates the registration device using an authentication process different from a second authentication process for authenticating the in-vehicle control unit.

3. The in-vehicle network system according to claim 1, wherein
the attestation data includes at least one of:
a password for the configuration management device to authenticate the in-vehicle control unit; and
a common key used for the in-vehicle control unit to generate a response in a challenge and response authentication performed by the configuration management device to authenticate the in-vehicle control unit.

4. The in-vehicle network system according to claim 1, wherein
the attestation data includes at least one of:
a common key used for the in-vehicle control unit to generate a digital signature from a message when the in-vehicle control unit transmits a message authentication code on the in-vehicle network; and
a common key used for the in-vehicle control unit to perform an encrypted communication on the in-vehicle network.

5. The in-vehicle network system according to claim 1, wherein
the configuration management device generates the attestation data using a one directional function that outputs a value different for each of the in-vehicle control unit, for each of software versions included in the in-vehicle control unit, for each of types of the car, or for each of car identification numbers distinguishing the car individually.

6. The in-vehicle network system according to claim 1, wherein the configuration management device, by receiving the attestation data or authentication data generated using the attestation data from the in-vehicle control unit joined in the in-vehicle network, authenticates the in-vehicle control unit joined in the in-vehicle network,
and wherein when the configuration management device cannot receive the attestation data or the authentication data as a response of a request for the in-vehicle control unit joined in the in-vehicle network to send the attestation data or the authentication data, when the configuration management device cannot receive the attestation data or the authentication data periodically from the in-vehicle control unit joined in the in-vehicle network, or when the configuration management device fails to authenticate the in-vehicle control unit, the configuration management device outputs an alarm signal indicating that the in-vehicle control unit is falsified or broadcasts a communication packet describing that the in-vehicle control unit is falsified to the in-vehicle network.

7. The in-vehicle network system according to claim 1, wherein
the in-vehicle control unit authenticates the configuration management device using the attestation data or authentication data that is generated using the attestation data.

8. The in-vehicle network system according to claim 7, wherein the in-vehicle control unit authenticates the configuration management device by receiving the attestation data or the authentication data, and wherein when the in-vehicle control unit cannot receive the attestation data or the authentication data as a response to a request for the configuration management device to send the attestation data or the authentication data, when the in-vehicle control unit cannot receive the attestation data or the authentication data periodically from the configuration management device, or when the in-vehicle control unit fails to authenticate the control management device, the in-vehicle control unit outputs an alarm signal indicating that the configuration management device is falsified, broadcasts a communication packet describing that the configuration management device is falsified to the in-vehicle network, or does not follow an instruction from the configuration management device thereafter.

9. The in-vehicle network system according to claim 1, wherein the attestation data includes an identification number describing a type of communication data transmitted between the configuration management device and the in-vehicle control unit, and wherein the configuration management device and the in-vehicle control unit transmit the attestation data using communication data specifying the identification number.

10. The in-vehicle network system according to claim 1, wherein the configuration management device works as a communication gateway that relays a communication between devices connected to the in-vehicle network, and wherein when the configuration management device fails to authenticate the registration device, the configuration management device blocks a communication between the registration device and the in-vehicle control unit.

11. The in-vehicle network system according to claim 1, wherein the registration device has a function as a rewrite device that rewrites software equipped in the in-vehicle control unit.

12. The in-vehicle network system according to claim 1, wherein the registration device is a communication device that temporarily connects to the in-vehicle network.

13. The in-vehicle network system according to claim 1, wherein the registration device is placed outside the car and communicates with the configuration management device or the in-vehicle control unit through the in-vehicle network.

14. The in-vehicle network system according to claim 1, wherein the configuration management device includes a database that manages a type of the in-vehicle control unit joining the in-vehicle network and a software version of the in-vehicle control unit joining the in-vehicle network, wherein the configuration management device updates data stored in the database in response to a request from the registration device, and wherein the registration device receives, from the registration device or the in-vehicle control unit, a query to the data stored in the database and responds the data stored in the database in response to the query.

* * * * *